Nov. 24, 1964

A. SKÁLA ETAL 3,158,251

CONTINUOUSLY TRANSFERRING AND ARRANGING
ROD-SHAPED ARTICLES

Filed July 5, 1960

INVENTORS
Antonín Skala & Karel
Hrbotický
BY Richard Ernst
Agt

United States Patent Office 3,158,251
Patented Nov. 24, 1964

3,158,251
CONTINUOUSLY TRANSFERRING AND ARRANGING ROD-SHAPED ARTICLES
Antonín Skála and Karel Hrbotický, Praha, Czechoslovakia, assignors to Zavody v. 1. Lenina, Plzen, Czechoslovakia
Filed July 5, 1960, Ser. No. 40,859
Claims priority, application Czechoslovakia, July 4, 1959, PV 3,941/59
9 Claims. (Cl. 198—32)

The present invention relates to a method and device for continuously transferring and arranging rod-shaped articles, in particular filters, for the purpose of connecting them to other rod-shaped articles, in particular cigarettes, as used for example in machines for connecting cigarettes to filters.

In the heretofore known cigarette-making machines in which the cigarettes are joined to the filters, the latter are allocated to the cigarettes on a special feeding device, which serves to cut double or multiple filters into two or more parts and thereupon to insert one part after the other between the cigarettes. A similar problem is encountered in practice in connection with other rod-shaped articles, such as in machines for the production of confectionery products and the like.

All heretofore known devices designed for the above purpose comprise intricate mechanisms shifting the rod-shaped articles towards one another by an intermittent movement. This is the reason why the rate of output of such a mechanism and thus the performance of the entire machine are relatively small. The aforementioned transfer mechanism requires a substantial space and thus increases the space occupied by the machine.

The present invention aims at removing the aforesaid disadvantages of the heretofore known designs. The main feature of the invention consists in the transfer of multiple filters or other rod-like articles by means of one or more transfer rollers. Such rollers transfer the individual parts of filters lying in one groove into empty neighbouring grooves. Thus the transfer of filter parts is effected continuously without any change in the circumferential velocity of the rollers, thereby leading therefore to an increase in the rate of output or performance of the entire machine.

The above, and other objects, features and advantages of the invention, will be apparent in the following detailed description of illustrative embodiments of the invention which is to be read in connection with the accompanying drawings, wherein.

The drawings represent the transfer of double or triple length filters or other rod-shaped objects by means of one or more transfer rollers which are provided with identical semi-circular grooves, in which the filters or rod-shaped articles are transferred from one groove into another and shifted into a single plane, being held in position by a vacuum in a known way and during the required time, as necessary for the given purpose. The number of grooves and their pitch distance or spacing are determined by the rules which will be set out hereinafter.

Figures 1, 1A:
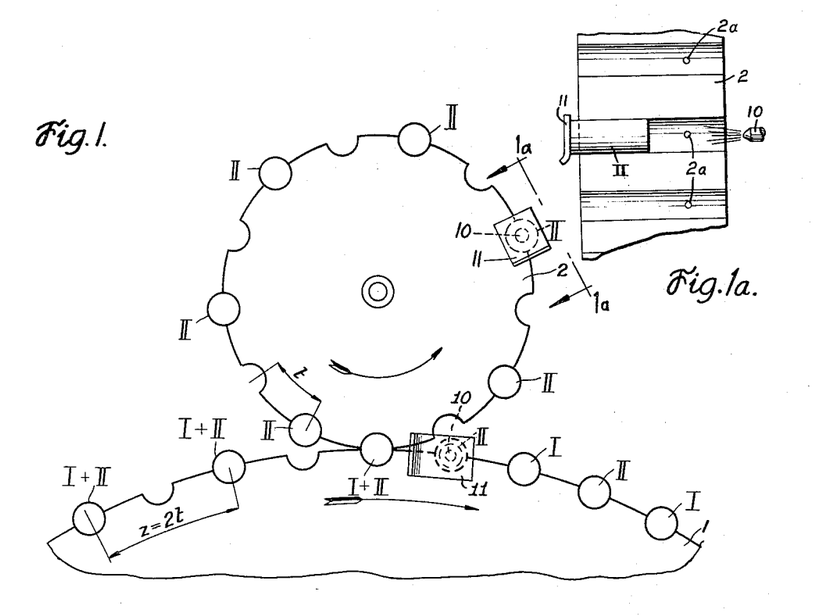
FIG. 1 is a diagrammatic elevational view of one embodiment of the invention, in which a filter of double length is transferred.
FIG. 1a is a fragmentary view of the periphery of the transfer roller in FIG. 1, as viewed in the direction of the arrows 1a—1a on FIG. 1.
Figure 2:
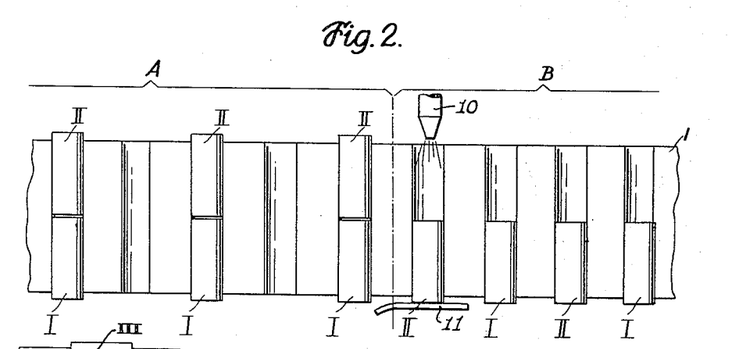
FIG. 2 is the corresponding plan view.
Figures 3, 3A, 4:
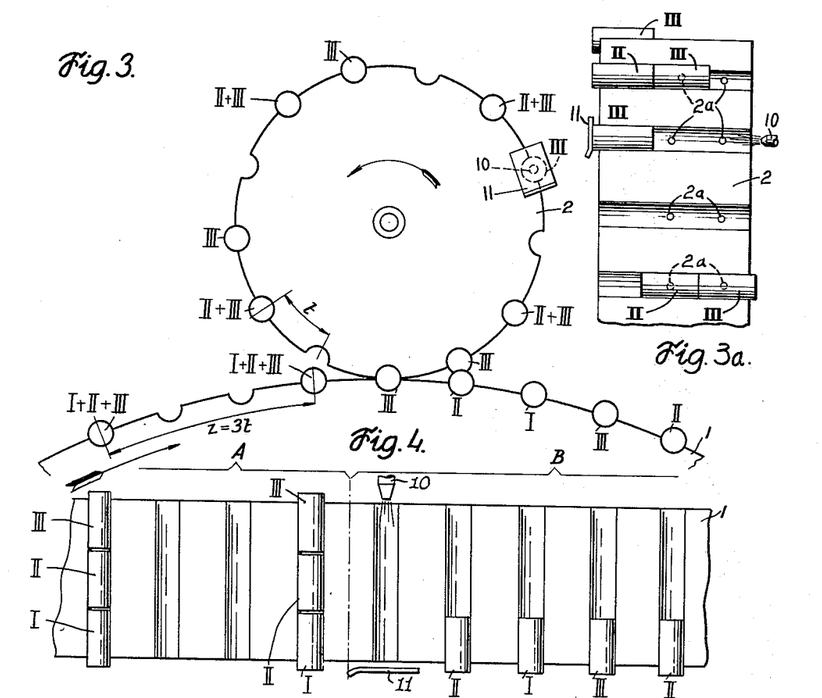
FIG. 3 is a diagrammatic elevational view of an arrangement for transferring a filter having a triple length.
FIG. 3a is a front elevational view of the transfer roller in the arrangement in FIG. 3.
FIG. 4 is the corresponding plan view showing the device of FIG. 3 in one operative position thereof.
Figure 5:
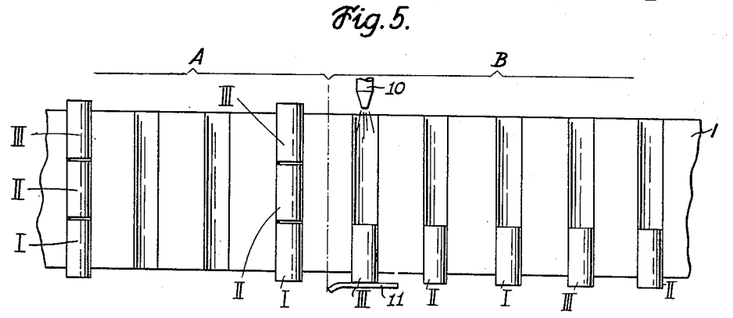
FIG. 5 is a similar plane view showing another operative position of the device of FIG. 3.

FIGS. 1 and 2 represent an exemplary embodiment in which filters of a double length are transferred by means of one working roller 1 and one transfer roller 2. The cut filters, each made up of two parts I and II, are conveyed on succession in the front section A of the working roller 1, in such a manner that between the occupied grooves there is always one empty groove. During the movement of the rollers in the direction of the arrow, the front parts I of the cut filters advance unobstructed below the transfer roller 2. As shown on FIG. 1a, each groove of roller 2 has a suction port 2a opening in the portion thereof corresponding to the position of the filter parts II in the grooves of roller 1 traveling through the zone or section A so that each filter part II is subjected to suction through a port 2a and thereby made to adhere in the corresponding groove of transfer roller 2 for transfer to the latter from roller 1 at the zone of tangency therebetween. The number of grooves in roller 2 is selected so that, after one full revolution on the roller 2, each part II is brought into registry with an empty groove of roller 1 and transferred to the latter for further transport by roller 1 through the section B.

During travel on roller 2, each filter part II is longitudinally shifted in the related groove of roller 2, for example, by compressed air issuing from a nozzle 10 (FIGS. 1 and 1a) and driving the filter part II against a fixed stop 11, so that, upon return of the filter part II to the zone of tangency of rollers 1 and 2, each filter part II has been shifted away from suction port 2a and is therefore free to be transferred into the empty groove of roller 1, and further each filter part II returned to a groove of roller 1 is in the same portion of the related groove as the filter parts I occupying the adjacent grooves.

FIGS. 3, 3a, 4 and 5 show the transfer of a three-piece filter, made up of the parts I, II, III and being conveyed on the working roller 1 through section A in every third groove, that is, with two empty grooves following each groove containing a three-piece filter. Transfer roller 2 has two suction ports 2a in each groove at the locations to which parts II and III are transferred from roller 1 and, therefore, takes-up the parts II and III only, whereas part I proceeds unobstructed with the working roller I. The transfer roller 2, after one revolution, transfers the second part II to the first empty groove of the working roller 1 in the section B and, after the second revolution, the remaining or third part III is returned to the remaining empty groove in section B.

Figures 6, 6A:
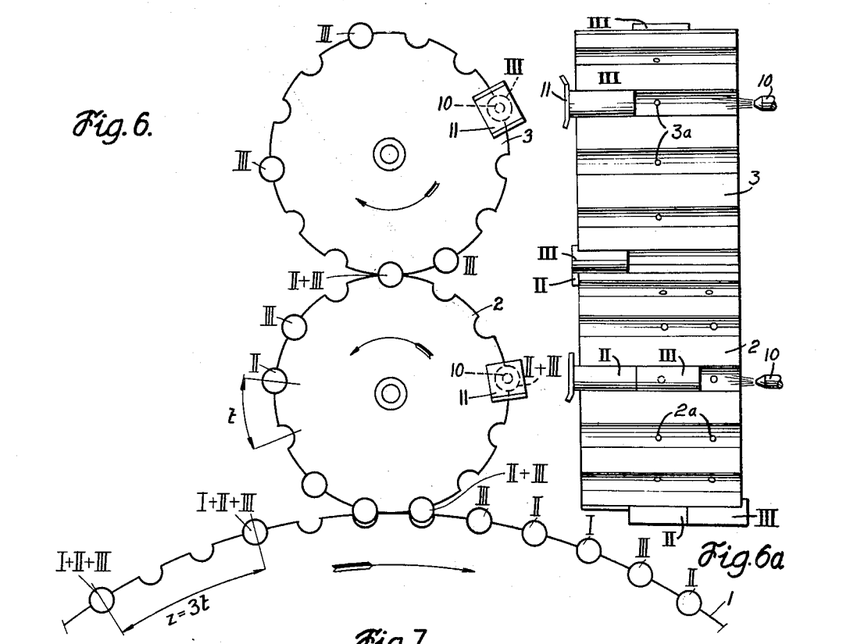
FIG. 6 is a diagrammatic elevational view of a device for transferring a three piece filter by means of two transfer rollers.
FIG. 6a is a front elevational view of the two transfer rollers in the device illustrated by FIG. 6.
Figure 7:
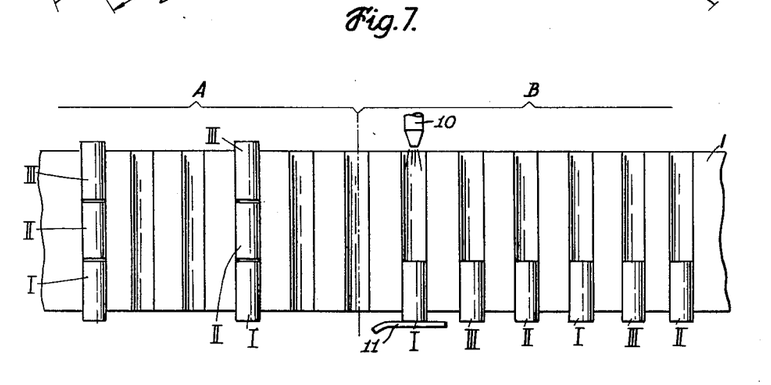
FIG. 7 is a plan view of the device in FIG. 6.

FIGS. 6, 6a and 7 represent the transfer of a three-piece filter I, II and III by means of two transfer rollers 2 and 3. Part I keeps advancing on the working roller 1 from section A to section B. The transfer roller 2 takes up parts II and III, parts II being transferred after one revolution to the empty grooves on the working roller 1 immediately behind parts I, and the parts III are taken-up by the roller 3. After one revolution the roller 3 transfers the part III back to the roller 2, which places them into the remaining empty grooves of the working roller 1 in section B.

The above operation of the arrangement in FIGS. 6, 6a and 7 may be achieved by providing roller 2 with two suction ports 2a in each groove at locations corresponding to the positions of parts II and III as transferred from roller 1 to roller 2, while roller 3 has only one suction port 3a in each groove thereof at a location corresponding to the position of each part III in a groove of roller 2 following the longitudinal shifting thereof by compressed air from the nozzle 10 associated with roller 2. While traveling on roller 3, each part III is further shifted by compressed air from the nozzle 10 associated with roller 3 and thereby freed from the effect of the suction at the related port 3a.

FIGS. 8, 8a, 8b and 9 show an embodiment similar to that of FIGS. 6 and 7, the only difference being that the transfer rollers are placed next to one another. Further, as shown on FIGS. 8a and 8b, each groove of roller 2 has a suction slot 2a located so as to be covered by the parts II and III as received from roller 1, but being partly uncovered to release the parts II and III after shifting of the latter by compressed air from a nozzle 10, while each groove of roller 3 has a suction port 3a located centrally therein to act on the part III received therein from roller 1 and to release the part III after shifting of the latter by compressed air from the nozzle 10 associated with roller 3. Part I continues to advance unobstructed on the working roller 1 from section A over section B to section C. The transfer roller 2 sucks the part II and III into a common groove on roller 2 and transfers both parts to one of the empty grooves in section B. The roller 3 takes up the part III transferring it, after one revolution, to the remaining empty groove of roller 1, whereas part II proceeds unobstructed from section B to section C.

FIGS. 10 to 18 illustrate embodiments in which a two-piece filter (see FIGS. 10 to 13) and a three-piece filter (FIGS. 14 to 18) are transferred. In these embodiments, the roller 2 acts as both a working roller and transfer roller, having empty grooves in a number corresponding to the number of parts to be transferred. In this case the transfer of parts is effected in a way similar to that described above with reference to FIGS. 1 and 2, and FIGS. 3-5, wherein an additional roller is provided to act only as a transfer roller.

When two-piece filters are being transferred on a working and transfer roller 2, as in FIGS. 10 to 13, the filters are first transferred to roller 2 from delivery roller 1 and cut into two parts by means of a disc knife 3 so as to produce parts I and II, whereupon the parts II are displaced by means of compressed air from a nozzle 10 at the moment when a rotated cam 4 assumes such a position that its recess forms a channel with the groove in the roller, through which part II is blown forward by the compressed air, whereas part I is transferred by the roller 2 onto a working roller 5. Part II always remains on the roller 2 for one revolution more than part I, before being transferred to the empty groove on the working roller 5.

Figure 10:
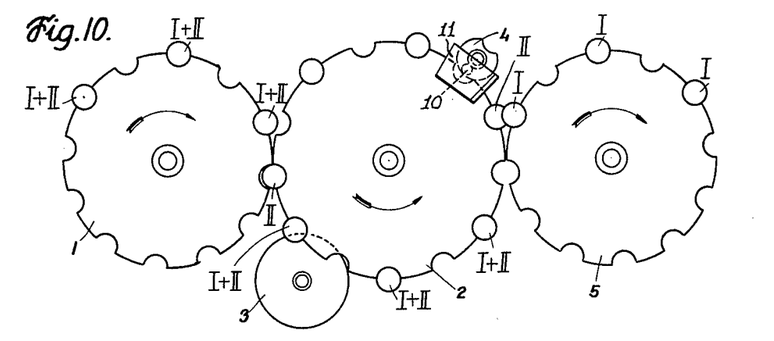
FIG. 10 is an elevational view of a modified embodiment for the transfer of a two-piece filter, and which is shown in one operative position thereof.
Figure 11:
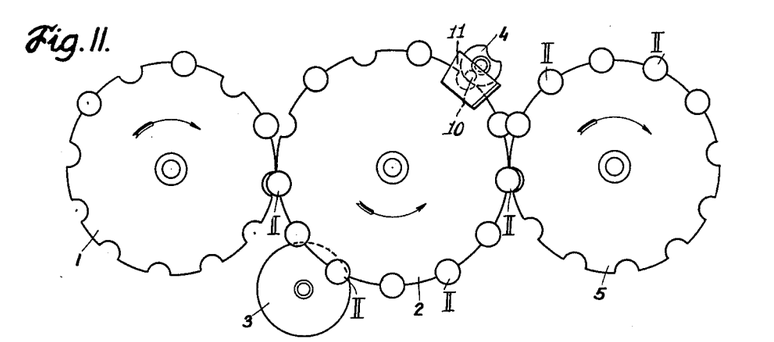
FIG. 11 illustrates the device of FIG. 10 in another operative position.
Figure 12:
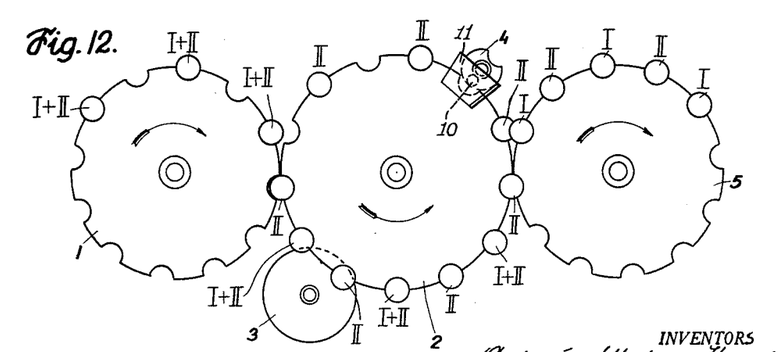
FIG. 12 illustrates the device of FIG. 10 in a further operative position.
Figure 13:
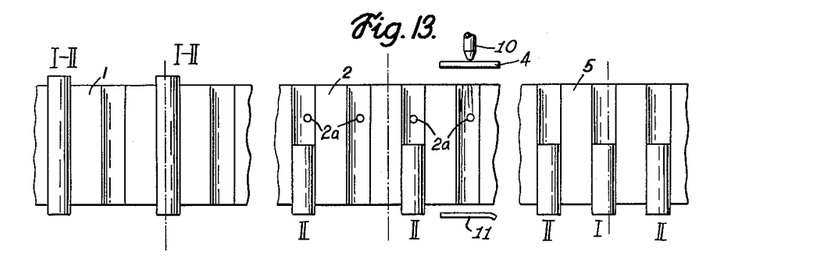
FIG. 13 is a plan view corresponding to the operative position of FIG. 12.

FIG. 10 shows the position of parts I during the course of the first revolution of roller 2. FIG. 11 shows the position of parts II during the course of the second revolution. For the sake of clarity the parts I are not identified on FIG. 11. FIG. 12 shows the position of both parts I and II after the second and further revolutions.

Figure 14:
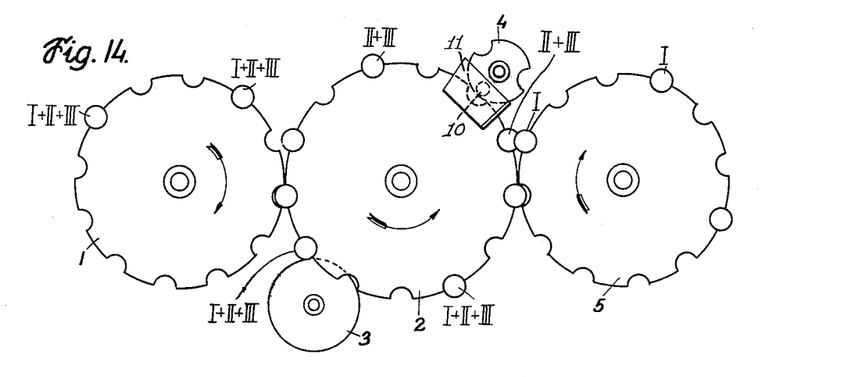
FIG. 14 is an elevational view of a modified arrangement for transferring three-piece filters.
Figure 15:
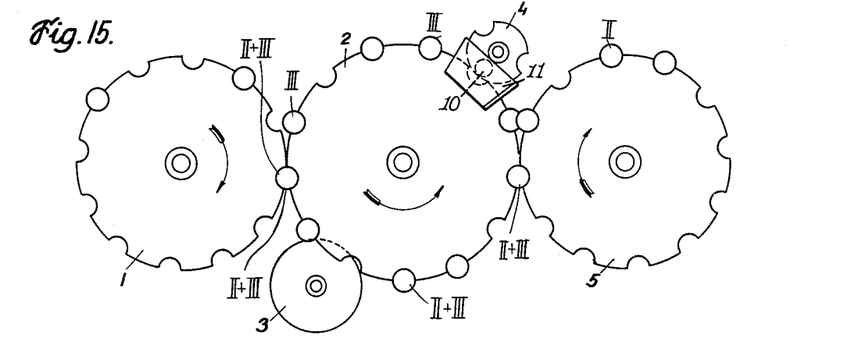
FIGS. 15, 16 and 17 show the arrangement of FIG. 14 in other operative positions during the second, third and fourth revolutions, respectively, of the roller.
Figure 16:
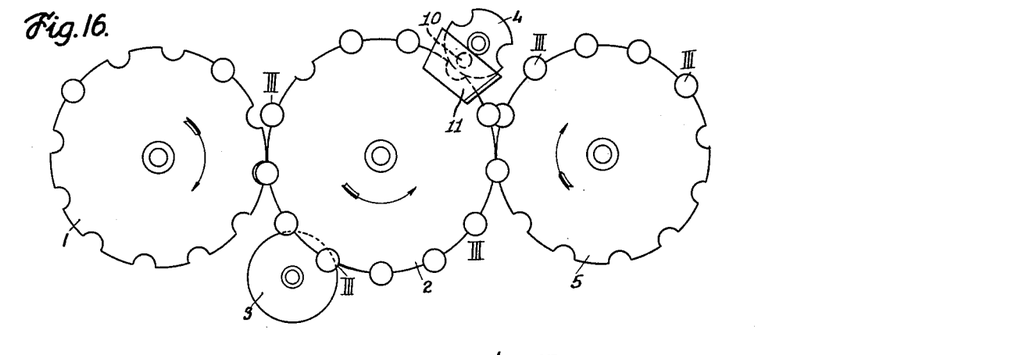
Figure 17:
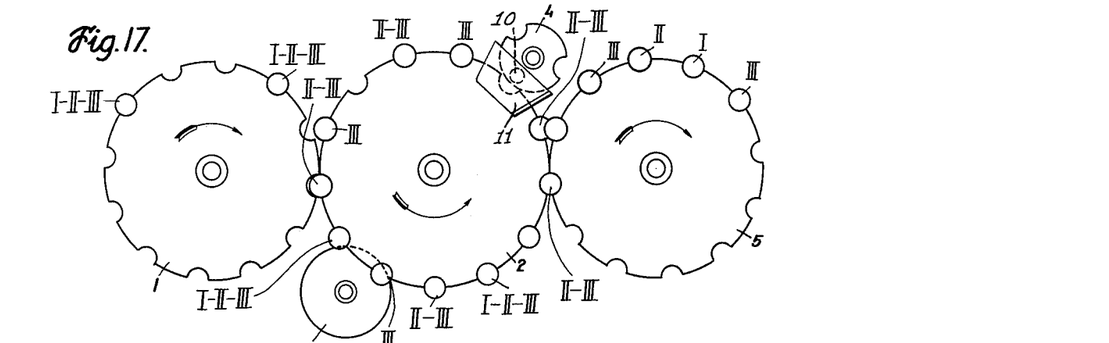
Figure 18:
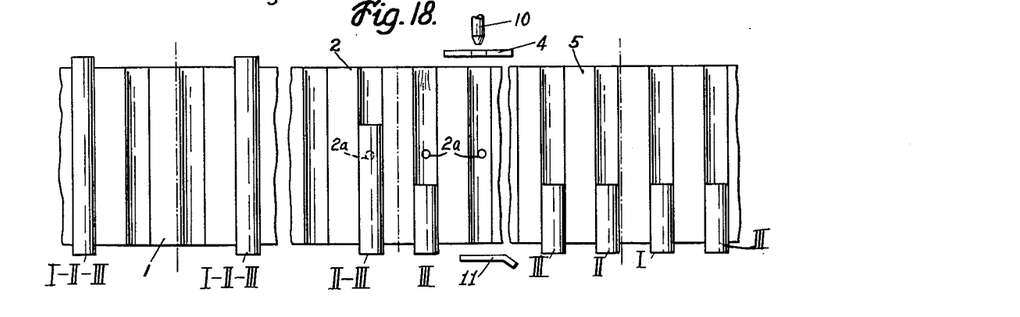
FIG. 18 is a plan view corresponding to FIG. 17.

When transferring a three-piece filter, as in FIGS. 14 to 18, with the same number of rollers, one more revolution of the working roller 2 is required for the transfer of each part III. With the arrangement of FIGS. 14 to 18, each filter transferred from roller 1 to roller 2 is cut on the latter by blade 3 to separate part I of the filter from parts II and III which remain joined together during the first revolution thereof with roller 2 (FIG. 14). During this first revolution of roller 2, the separated or cut parts I are transferred to roller 5, while the joined together parts II and III are shifted in the related grooves of roller 2 by the action of compressed air from nozzle 10 cooperating with cam 4. During the second revolution of roller 2, the previously shifted parts II and III are cut by knife 3, and the parts II are transferred to the empty grooves of roller 5 immediately following the grooves occupied by parts I (FIG. 15). Further, during the second revolution of roller 2, the parts III remaining thereon are shifted in the related grooves by compressed air from nozzle 10 cooperating with cam 4 so that, when parts III are transferred to the remaining empty grooves of roller 5 during the third revolution of parts III with roller 2, all of the parts I, II and III on roller 5 occupy the same positions in the related grooves (FIGS. 16, 17 and 18).

In accordance with this invention, the number of empty grooves on the working roller, or on a portion thereof (section A) carrying the still uncut filter parts i.e. when the process of transferring and arranging begins, must always be smaller by one than the number of filter parts or other rod-like articles which have to be transferred. A three-piece filter (the filter rod has to yield three filter parts) requires for instance, that two grooves should be empty on the working roller between the successive filters. The pitch or spacing ($t$) between the grooves on all rollers is equal, so that when all rollers rotate with the same circumferential velocity their various grooves meet exactly at the points of contact or tangency. The number of grooves in the transfer roller, when one roller is used, (in FIGURES 1, 3, 10, 11, 12, 13, 14, 15, 16, 17, 18 the transfer roller is identified by the reference numeral 2) must be a number which has no common divisor with the number of filter parts to be transferred. From a series of such numbers, that one is chosen which complies with the requirements of the design and operation of the driving mechanism and the economy of operation and space requirements of the machine.

When more than one transfer roller is used (as indicated at 2, 3 on FIGS. 6 and 8), the number of transfer rollers must be no more than one less than the number of transferred parts, and the length of path traversed by the individual parts, which may be represented by the number of pitches (spacings) through which the respective part travels before it is transferred, must be in accordance with the following rule: The number of pitches on the basic working roller is not of any importance, but the numbers of pitches or grooves on the successive transfer rollers, for example, the rollers 2 and 3 on FIGS. 6 or 8, must be selected so that the remainders of the quotients of the numbers of groove pitches travelled by the parts II and parts III on the successive transfer rollers prior to the return thereof to the working roller divided by the number of filter parts derived from each filter form a general series of numbers, for example, 1–2–3.

Figures 8, 8A, 9:
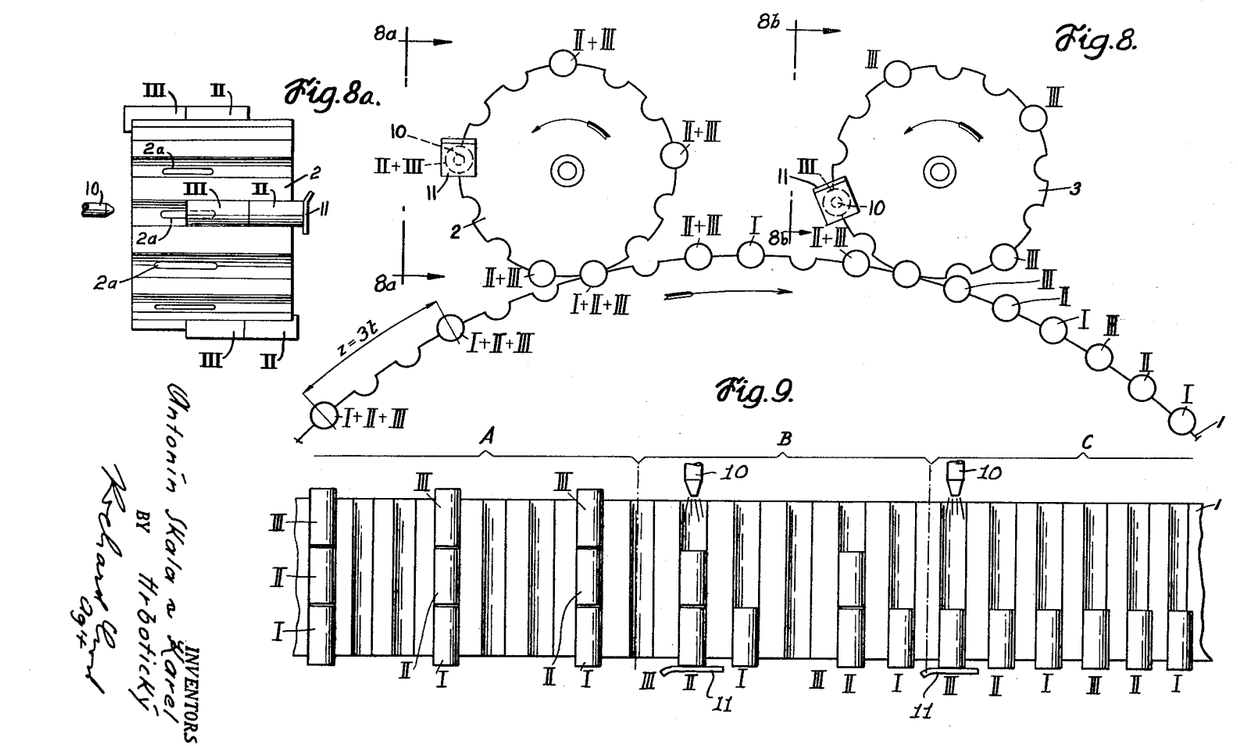
FIG. 8 is a diagrammatic elevational view of a similar embodiment, but with two juxtaposed transfer rollers.
FIGS. 8a and 8b are back elevational views of the two transfer rollers included in the embodiment of FIG. 8 as viewed in the direction of the arrows 8a—8a and the arrows 8b—8b, respectively.
FIG. 9 is a plan view of the device in FIG. 8.
Figure 8B:
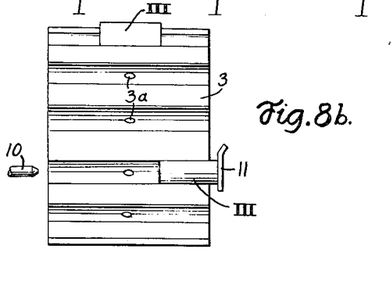

When, for example, a three-piece filter is to be transferred, a maximum of two transfer rollers can be used (see FIGS. 6 and 8). Part I proceeds unobstructed below the transfer roller 2 from section A to section B (FIG. 6), or below transfer rollers 2 and 3 to section C (FIG. 8). Part II traverses a path equal to the number of pitches on transfer roller 2, while part III traverses a path equalling the sum of pitches of rollers 2 and 3.

According to the second rule, which also has been quoted above, the number of pitches traversed by part II on the transfer roller 2, or, alternatively part III on transfer rollers 2 and 3, must not be divisible by the number of parts to be transferred, i.e. by the number 3.

The third rule i.e. that the remainders of the quotients of the path of the filter parts, expressed by the number of pitches, divided by the number of parts to be transferred must form a series of numbers, serves for checking whether the number of grooves on the transfer rollers is suitable. In the case under consideration the series of numbers can only be 0, 1, 2. The first part I does not traverse any path on the transfer rollers, so that the quotient remainder is therefore zero. The second part II traverses a path equalling the number of pitches on roller 2, for example, 13 pitches, and the quotient remainder 13/3 is therefore 1. The third part III traverses a path of 26 pitches, that is, the sum of the pitches on rollers 2 and 3, and the quotient remainder of 26/3 is therefore 2. The quotient remainders thus form the required series of numbers and a three-piece filter can therefore be transferred and arranged by means of two transfer rollers each having 13 pitches.

If a four-piece filter is to be transferred and arranged by means of two transfer rollers (not shown in the drawing), the smallest number of pitches on each transfer roller, which is not divisible by the number of parts of the filter, is the number 9. However, the transfer rollers can have other numbers of pitches, such as 11, 13, 15, etc. The second transfer roller will further have a number of pitches selected so that the required series of numbers is completed, said series being in the present case 0, 1, 2 and 3.

Part I advances unobstructed on the working roller, without passing to any transfer roller, the quotient remainder being 0.

Part II traverses a path equalling the number of pitches of the first transfer roller. With the assumed number of 9 pitches on the first transfer roller the quotient remainder is 1 (1 times 9 pitches divided by four parts).

Part III has in this case to carry out two revolutions on any of the two transfer rollers, for instance on the first. The quotient remainder will be 2 (2 times 9 pitches divided by four parts).

Part IV has to traverse a path having such a number of pitches that the quotient remainder equals 3. Part IV traverses a path amounting on the one hand to 2 times 9 pitches on the first roller and on the other hand to the number of pitches on the second roller which is selected so that the quotient remainder is 3. In the case under consideration the rollers can have 9, 13, 15 pitches etc. (2 times 9 pitches plus for instance 9 pitches equals 27 pitches: which, when divided by 4, gives a quotient remainder of 3.)

The advantages of transferring and arranging rod-shaped articles by means of several rollers with the above described mathematical relationship between the number of pitches on the individual rollers are of importance, in the first place, in the tobacco industry, where cigarettes have to be transferred and arranged on packing machines as a higher rate of output of the machines results therefrom together with a simple and easy design of various known elements. The invention can be applied also in connection with other products, such as machines for the production of confectionery products, and in particular is applicable to the handling of rod-shaped articles which for technological reasons have to be transferred and arranged to form a given continuous row and to assume a predetermined position. Although precise embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention which is intended to be defined by the appended claims.

We claim:

1. A method of continuously arranging a succession of rod-shaped members; comprising the steps of placing rod-shaped articles, each of which is divided into a plurality of parts constituting said members, into axially extending grooves spaced apart equally in the circumferential direction on the surface of a working roller, with at least one empty groove being left on said working roller between the successive grooves of the latter in which said articles are placed, rotating at least one transfer roller at the same circumferential speed as said working roller and tangentially to the latter, with said transfer roller having axially extending grooves in the surface thereof which are circumferentially spaced apart by distances equal to the spacing between said grooves of the working roller and which register successively with the latter grooves during rotation of the working and transfer rollers, the number of said transfer rollers being smaller by at least one than the number of said parts into which each of said articles is divided, retaining one of said parts of each article in the groove of the working roller in which the article has been placed while transferring at least another of said parts to a groove of said transfer roller which registers with an article containing groove of the working roller, the number of grooves in the transfer roller being selected so that, upon a revolution of the transfer roller, a groove of the latter to which said other part of an article has been transferred then registers with an empty groove of said working roller, and returning said other part of the article to said empty groove of the working roller.

2. The method as in claim 1; wherein the number of empty grooves between the successive grooves of the working roller in which the articles are placed is one less than the number of said parts into which each article is divided.

3. The method as in claim 2; wherein a single transfer roller is employed and the number of said grooves in the transfer roller has no common diviser with said number of the parts into which each article is divided.

4. The method as in claim 2; wherein at least two transfer rollers are employed, and a general series of numbers is formed by the remainders of the quotients of the number of groove spacings on the transfer rollers travelled by each transferred part prior to return to the working roller divided by the number of parts making up each article.

5. A device for continuously transferring and arranging rod-shaped articles which are divided in at least two parts for the purpose of joining said parts to other rod-shaped articles, comprising at least one working roller, at least one transfer roller tangential to said working roller, each of said working and transfer rollers having grooves for receiving the articles, means for imparting rotary movement to said rollers, said grooves having equal pitches therebetween on the rollers so that grooves register at the point of tangency of the rollers, means associated with at least one of said rollers for imparting longitudinal movement to at least some parts of the articles placed in the grooves thereof, means for retaining parts of the articles on each transfer roller during rotary movement of the latter, said rollers being operative to transfer to a transfer roller a part of each of the articles placed in the grooves of said working roller in a predetermined sequence and to return each transferred part to an unoccupied groove of said working roller, the number of transfer rollers being smaller by at least one than the number of parts into which each article is divided.

6. A device as in claim 5; further comprising means placing said articles in successively spaced apart grooves of said working roller with a number of empty grooves being left between the successive grooves receiving said articles.

7. A device as in claim 6; wherein said number of empty grooves left between the successive grooves receiving articles on said working roller is one less than the number of parts into which each article is divided.

8. A device as in claim 7; wherein a single transfer roller is included, and the number of said grooves on the single transfer roller has no common divisor with said number of parts into which each article is divided.

9. A device as in claim 7; wherein at least two transfer rollers are included, and the numbers of grooves on said transfer rollers are selected so that a general series of numbers is formed by the remainders of the quotients of the number of groove pitches on the transfer rollers travelled by the successive parts of each article prior to return to said working roller divided by the number of parts making up each article.

References Cited by the Examiner

UNITED STATES PATENTS 2,944,654    7/60    Schubert _______________ 198—32

FOREIGN PATENTS 1,170,767    1/59    France.

SAMUEL F. COLEMAN, *Acting Primary Examiner.*

ERNEST A. FALLER, Jr., SAMUEL LEVINE,
*Examiners.*